United States Patent
Cawthorne et al.

(10) Patent No.: US 6,170,830 B1
(45) Date of Patent: *Jan. 9, 2001

(54) DUAL FUNCTIONING SEAL FOR ROCK BITS

(75) Inventors: Chris E. Cawthorne; Sujian Huang; Zhigang Fang; Michael A. Siracki, all of The Woodlands, TX (US)

(73) Assignee: Smith International, Inc., Houston, TX (US)

( * ) Notice: Under 35 U.S.C. 154(b), the term of this patent shall be extended for 0 days.

This patent is subject to a terminal disclaimer.

(21) Appl. No.: 09/090,448

(22) Filed: Jun. 4, 1998

Related U.S. Application Data

(63) Continuation of application No. 08/727,275, filed on Oct. 8, 1996, now Pat. No. 5,842,701.

(51) Int. Cl.$^7$ .......................................................... F16J 15/34
(52) U.S. Cl. ..................... 277/336; 277/407; 277/589; 277/910; 277/944
(58) Field of Search ..................... 277/336, 380, 277/399, 407, 500, 589, 910, 936, 944

(56) References Cited

U.S. PATENT DOCUMENTS

| | | | |
|---|---|---|---|
| 2,360,731 | 10/1944 | Smith | 286/26 |
| 2,360,735 | 10/1944 | Smith | 288/4 |
| 3,199,540 | 8/1965 | Forster | 137/625.69 |
| 3,328,041 | 6/1967 | Bloom et al. . | |
| 3,351,350 | 11/1967 | Shepler . | |
| 3,397,928 | * 8/1968 | Galle . | |
| 3,467,448 | 9/1969 | Galle | 308/8.2 |
| 3,765,495 | 10/1973 | Murdoch et al. | 175/371 |
| 3,788,654 | 1/1974 | Mandley . | |
| 4,223,896 | 9/1980 | Ström . | |
| 4,262,914 | 4/1981 | Roley . | |
| 4,304,415 | 12/1981 | Wolf et al. . | |
| 4,305,595 | 12/1981 | Miyagishima et al. . | |
| 4,466,621 | 8/1984 | Garner et al. . | |
| 4,776,599 | 10/1988 | Vezirian . | |
| 4,796,858 | 1/1989 | Kabel | 251/171 |
| 5,195,757 | 3/1993 | Dahll, V. . | |
| 5,269,539 | 12/1993 | Martin . | |
| 5,323,863 | 6/1994 | Denton | 175/57 |
| 5,362,073 | 11/1994 | Upton et al. . | |
| 5,380,016 | 1/1995 | Reinsma et al. . | |

FOREIGN PATENT DOCUMENTS

| | | |
|---|---|---|
| 274262 | 12/1989 | (DE) . |
| 681312 | 10/1952 | (GB) . |
| 2012375 | 7/1979 | (GB) . |
| 6174105 | 6/1994 | (JP) . |

* cited by examiner

*Primary Examiner*—Anthony Knight
*Assistant Examiner*—John L. Beres
(74) *Attorney, Agent, or Firm*—Christie, Parker & Hale, LLP

(57) ABSTRACT

Dual functioning seals for use in forming a lubricant seal in a rotary rock bit comprise an annular elastomeric seal body having a dynamic seal surface for sealing against a dynamic surface and a static seal surface for sealing against a static surface. The seal body has an asymmetric axial cross-sectional geometry the dynamic seal surface having a greater radius of curvature than that of the static seal surface. The dynamic and static seal surfaces are formed from different elastomeric materials, and the dynamic seal surface is formed from an elastomeric material that is harder and more wear resistant than the elastomeric material used to form the static seal surface. A rotary rock bit seal constructed in this manner is well adapted to accommodate the different operating conditions and sealing requirements that exist both at the dynamic and static surfaces of the seal to ensure optimal seal performance and, thereby enhance the service life of the rock bit.

31 Claims, 2 Drawing Sheets

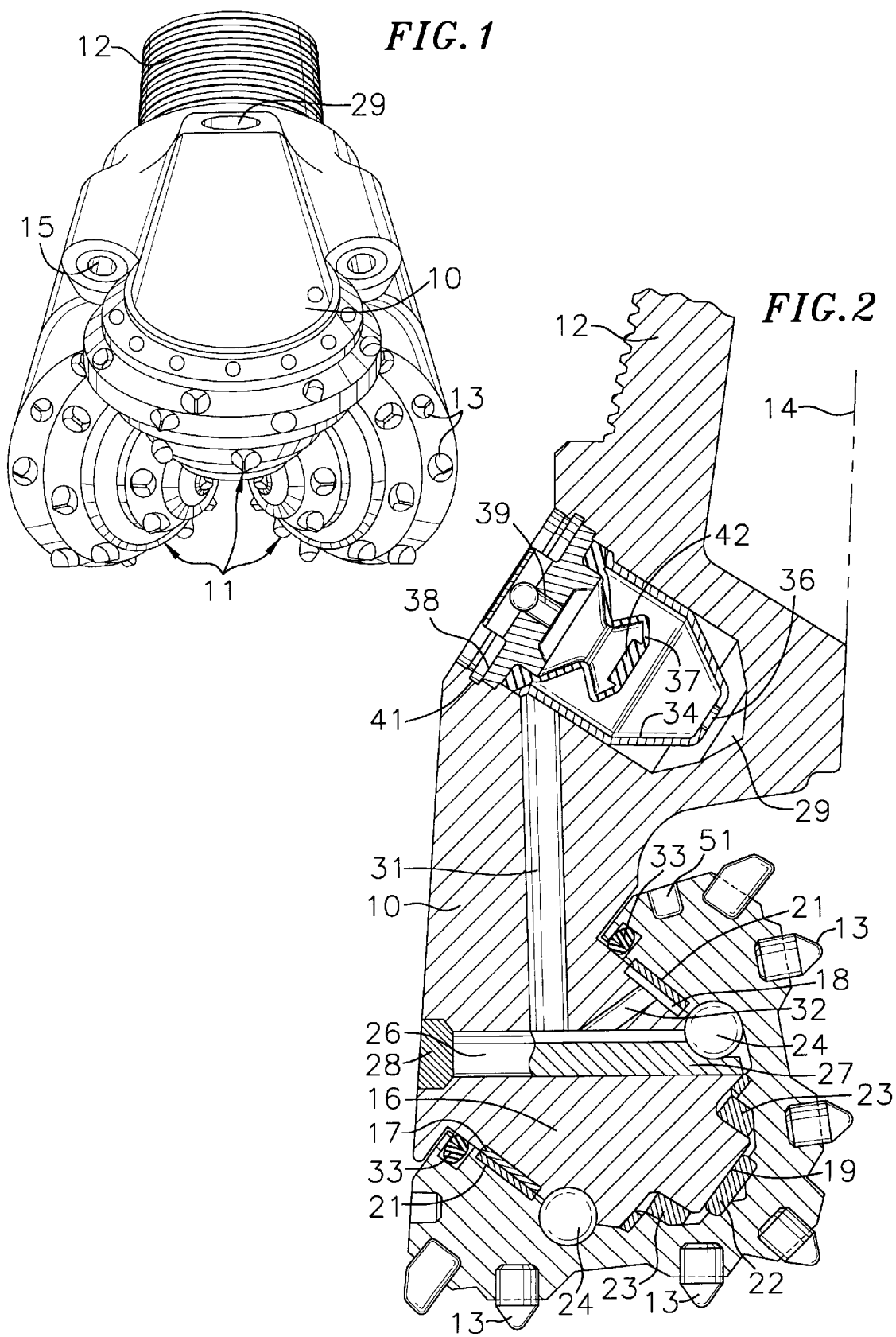

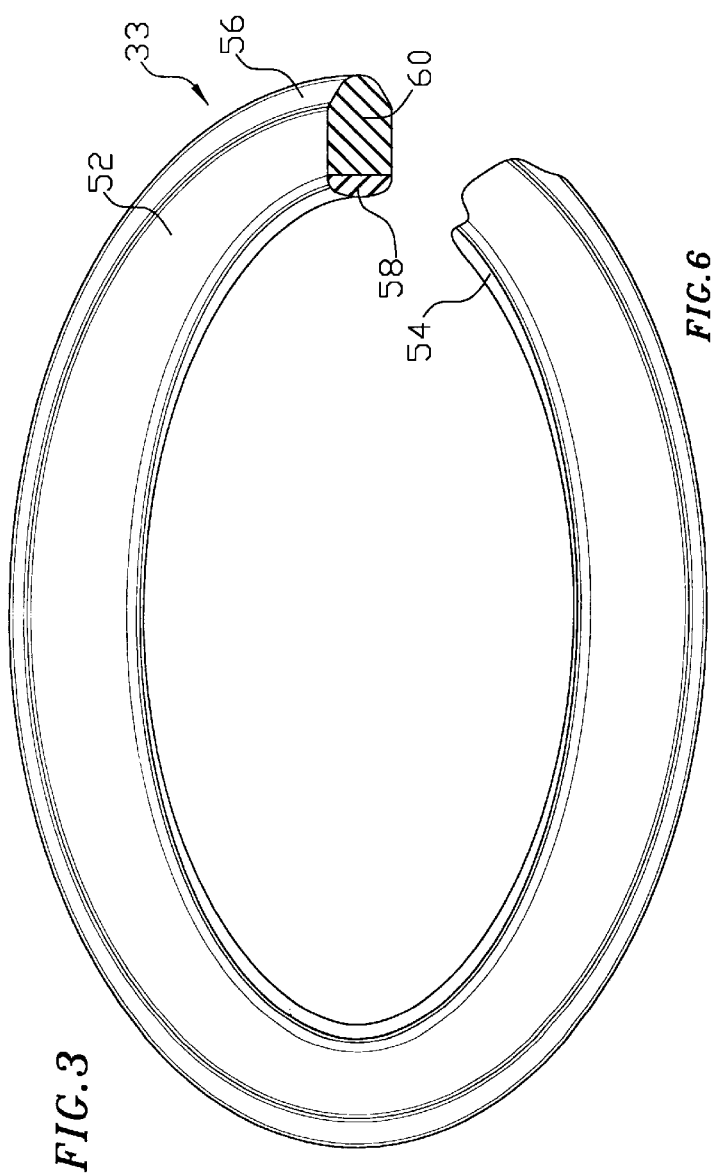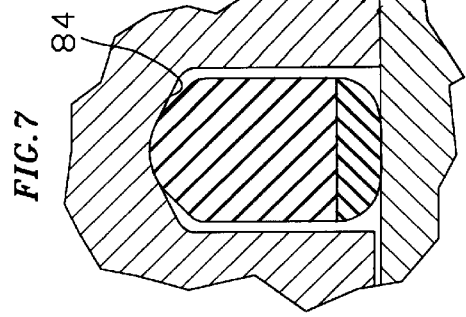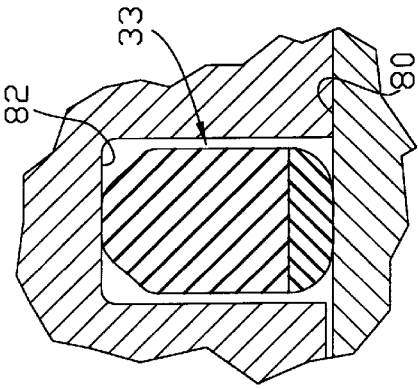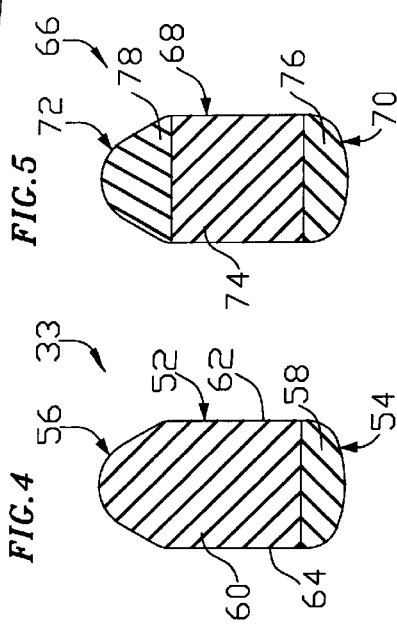

DUAL FUNCTIONING SEAL FOR ROCK BITS

RELATION TO COPENDING PATENT APPLICATION

This patent application is a continuation of U.S. patent Ser. No. 08/727,275 that was filed on Oct. 8, 1996, now U.S. Pat. No. 5,842,701.

FIELD OF THE INVENTION

This invention relates to a seal for retaining lubricant around a journal bearing in a rock bit or drill bit for drilling oil wells or the like. More particularly, this invention relates to seal rings that are constructed having different dynamic and static surface geometries formed from different types of rubber material to provide enhanced properties of wear resistance and contact pressure at each seal surface to maximize seal life.

BACKGROUND OF THE INVENTION

Rock bits are employed for drilling wells, blast holes, or the like in subterranean formations for oil, gas, geothermal steam, minerals, and the like. Such drill bits have a body connected to a drill string and a plurality, typically three, of hollow cutter cones mounted on the body for drilling rock formations. The cutter cones are mounted on steel journals or pins integral with the bit body at its lower end. In use, the drill string and/or the bit body are rotated in the bore hole, and each cone is caused to rotate on its respective journal as the cone contacts the bottom of the bore hole being drilled. High temperatures and pressures are often encountered when such rock bits are used for drilling in deep wells.

When a drill bit wears out or fails as a bore hole is being drilled, it is necessary to withdraw the drill string for replacing the bit. The amount of time required to make a round trip for replacing a bit is essentially lost from drilling operations. This time can become a significant portion of the total time for completing a well, particularly as the well depths become great. It is therefore quite desirable to maximize the service life of a drill bit in a rock formation. Prolonging the time of drilling minimizes the time lost in "round tripping" the drill string for replacing the bits. Replacement of a drill bit can be required for a number of reasons, including wearing out or breakage of the structure contacting the rock formation.

One reason for replacing the rock bits include failure or severe wear of the journal bearings on which the cutter cones are mounted. These bearings can be friction- or roller-type bearings, and can be subject to high loads, high hydrostatic pressures in the hole being drilled, high temperatures due to drilling, elevated temperatures in the formation being drilled, as well as harmful abrasive particles originating from the formation being drilled. The journal bearings are lubricated with grease adapted to such severe conditions. Such lubricants are a critical element in the life of a rock bit. A successful grease should have a useful life longer than other elements of the bit so that premature failures of bearings do not unduly limit drilling.

The grease is retained within the rock bit to lubricate the journal bearings by a journal bearing seal, typically an O-ring type of seal. The seal must endure a range of temperature and pressure conditions during the operation of the rock bit to prevent the grease from escaping and/or contaminants from entering the bearing and, thereby ensure that the journal bearings are sufficiently lubricated. Elastomer seals known in the art are conventionally formed from a single type of rubber or elastomeric material, and are generally formed having identically configured dynamic and static seal surfaces, i.e., having a symmetric axial cross-sectional geometry.

The rubber or elastomeric material selected to form such a seal has particular hardness, modulus of elasticity, wear resistance, temperature stability, and coefficient of friction. Additionally, the particular geometric configuration of the seal surfaces produces a given amount of seal deflection that defines the degree of contact pressure or "squeeze" applied by the dynamic and static seal surfaces against respective journal bearing and cone surfaces.

The wear, temperature, and contact pressure conditions that are encountered at the dynamic seal surface are different than those encountered at the static seal surface. Therefore, the type of seal material and seal geometry that is ultimately selected to form both seal surfaces represents a compromise between satisfying the operating conditions that occur at the different dynamic and static seal surfaces. Because of the different operating conditions at each seal surface, conventional seals formed from a single-type of material, having symmetric axial cross-sectional geometries, often display poor wear resistance and poor temperature stability at the dynamic seal surface where wear and temperature conditions, under high-temperature operating conditions, are the most aggressive. Accordingly, the service life of rock bits that contain such seals are defined by the limited capability of the seal itself.

U.S. Pat. No. 3,765,495 discloses a drill bit seal configured having a greater radial cross section than axial cross section by a ratio of at least 1.5:1. The seal has a symmetrical generally rectangular axial cross section and is made from a single type of elastomer. The seal has identically configured dynamic and static surfaces, and is formed from a single type of elastomeric material, reflecting a compromise between meeting the different operating conditions at each seal surface. Accordingly, a high-aspect ratio seal constructed in this manner is less than optimized to perform satisfactorily under the high temperature and pressure conditions encountered in a rock bit.

U.S. Pat. No. 5,362,073 discloses a composite rock bit seal formed from two or more different materials selected to provide a desired degree of wear resistance at the dynamic seal surface, and to provide a desired degree of seal contact at the static seal surface. The seal has a dynamic seal surface formed from a single type of elastomeric material, and has an inner and outer static seal surfaces that are each formed from different materials. Further, the dynamic seal surface has a radius of curvature less than that of each static seal surface. Although the seal surfaces are constructed from materials having different hardnesses, the seal geometry at each dynamic and static surface does not produce a desired degree of contact pressure at each respective rock bit surface.

It is, therefore, desired that journal bearing seals be constructed having a static seal surface and a dynamic seal surface that is each designed to accommodate the particular wear and temperature conditions that exist at each interfacing surface. It is desired that such journal bearing seals be designed to provide a desired degree of contact pressure at each static and dynamic surface.

SUMMARY OF THE INVENTION

There is, therefore, provided in practice of this invention a dual functioning seal for use in rotary rock bits. The seal comprises an annular elastomeric ring-shaped seal body having a dynamic seal surface along a circumference of an inside body diameter, and a static seal surface along a circumference of an outside body diameter. The seal body has an asymmetric axial cross-sectional geometry defined by the construction of the dynamic and static seal surfaces, wherein the dynamic seal surface has a radius of curvature that is greater than a radius of curvature for the static seal surface. The asymmetric axial cross-sectional seal surface geometry is designed to impose a greater contact pressure against the static cone surface than against the dynamic journal surface to thereby ensure that the static seal surface remains stationary against the static cone surface.

The dynamic and static seal surfaces are each formed from different elastomeric materials. The dynamic seal surface is formed from an elastomeric material that is harder and more wear resistant than that used to form the static seal surface. Preferably, the dynamic seal surface is formed from an elastomeric material having a durometer Shore A hardness at least five points higher than the elastomeric material used to form the static seal surface. The differently shaped dynamic and static seal surfaces, formed from the different elastomeric materials, are designed to apply a higher frictional force against the static surface than against the dynamic surface to prevent seal movement against the cone. An another embodiment, the seal body, static seal surface, and dynamic seal surface are each formed from different elastomeric materials.

Dual functioning seals constructed in this manner are well adapted to accommodate the different operating conditions and sealing requirements that exist both at the dynamic and static surfaces of the seal to ensure optimal seal performance and, thereby enhance the service life of rock bits that contain such seals.

BRIEF DESCRIPTION OF THE DRAWINGS

These and other features and advantages will become appreciated as the same becomes better understood with reference to the specification, claims and drawings wherein:

FIG. 1 is a semi-schematic perspective view of a rock bit containing a dual functioning seal constructed according to the principles of this invention;

FIG. 2 is a partial cross-sectional view of the rock bit in FIG. 1;

FIG. 3 is a perspective view of one embodiment of a dual functioning seal constructed according to principles of this invention;

FIG. 4 is a cross-sectional view of the dual functioning seal in FIG. 3;

FIG. 5 is a cross-sectional view of another embodiment of a dual functioning seal as constructed according to principles of this invention;

FIG. 6 is a cross-sectional view of the dual functioning seal in FIG. 3 interposed between a static cone and dynamic journal surface; and FIG. 7 is a cross-sectional view of the dual functioning seal in FIG. 3 interposed between a static cone and dynamic journal surface having an alternative cone surface configuration.

DETAILED DESCRIPTION

A rock bit employing a dual seal constructed according to principles of this invention comprises a body 10 having three cutter cones 11 mounted on its lower end, as shown in FIG. 1. A threaded pin 12 is at the upper end of the body for assembly of the rock bit onto a drill string for drilling oil wells or the like. A plurality of tungsten carbide inserts 13 are pressed into holes in the surfaces of the cutter cones for bearing on the rock formation being drilled. Nozzles 15 in the bit body introduce drilling fluid into the space around the cutter cones for cooling and carrying away formation chips drilled by the bit.

Generally, dual functioning seals constructed according to principles of this invention comprise an annular seal body in the shape of a ring that has differently configured static and dynamic seal surfaces, i.e., has an asymmetric axial cross-sectional geometry, and that is formed from different types of elastomeric or rubber materials. The static and dynamic seal surfaces are each configured to balance deflection against contact pressure associated with the modulus of the materials to maximize seal performance at each surface during operation. The materials that are used to form the seal body are selected to provide properties of wear resistance, hardness, friction resistance, and temperature stability that are well suited to match the different operating conditions at each static and dynamic surface during operation.

FIG. 2 is a fragmentary, longitudinal cross-section of the rock bit, extending radially from the rotational axis 14 of the rock bit through one of the three legs on which the cutter cones 11 are mounted. Each leg includes a journal pin extending downwardly and radially, inwardly on the rock bit body. The journal pin includes a cylindrical bearing surface having a hard metal insert 17 on a lower portion of the journal pin. The hard metal insert is typically a cobalt or iron-based alloy welded in place in a groove on the journal leg and having a substantially greater hardness that the steel forming the journal pin and rock bit body.

An open groove 18 is provided on the upper portion of the journal pin. Such a groove may, for example, extend around 60 percent or so of the circumference of the journal pin, and the hard metal insert 17 can extend around the remaining 40 percent or so. The journal pin also has a cylindrical nose 19 at its lower end.

Each cutter cone 11 is in the form of a hollow, generally-conical steel body having cemented tungsten carbide inserts 13 pressed into holes on the external surface. For long life, the inserts may be tipped with a polycrystalline diamond layer. Such tungsten carbide inserts provide the drilling action by engaging a subterranean rock formation as the rock bit is rotated. Some types of bits have hard-faced steel teeth milled on the outside of the cone instead of carbide inserts.

The cavity in the cone contains a cylindrical bearing surface including an aluminum bronze insert 21 deposited in a groove in the steel of the cone or as a floating insert in a groove in the cone. The aluminum bronze insert 21 in the cone engages the hard metal insert 17 on the leg and provides the main bearing surface for the cone on the bit body. A nose button 22 is between the end of the cavity in the cone and the nose 19 and carries the principal thrust loads of the cone on the journal pin. A bushing 23 surrounds the nose and provides additional bearing surface between the cone and journal pin. Other types of bits, particularly for higher rotational speed applications, have roller bearings instead of the exemplary journal bearings illustrated herein. It is to be understood that dual functioning seals constructed according to principles of this invention may be used with rock bits comprising either roller bearings or conventional frictional journal bearings.

A plurality of bearing balls 24 are fitted into complementary ball races in the cone and on the journal pin. These balls are inserted through a ball passage 26, which extends through the journal pin between the bearing races and the exterior of the rock bit. A cone is first fitted on the journal pin, and then the bearing balls 24 are inserted through the ball passage. The balls carry any thrust loads tending to remove the cone from the journal pin and thereby retain the cone on the journal pin. The balls are retained in the races by a ball retainer 27 inserted through the ball passage 26 after the balls are in place. The retainer 27 is then welded 28 at the end of the ball passage to keep the ball retainer in place. The bearing surfaces between the journal pin and the cone are lubricated by a grease. Preferably, the interior of the rock bit is evacuated, and grease is introduced through a fill passage (not shown). The grease thus fills the regions adjacent the bearing surfaces plus various passages and a grease reservoir, and air is essentially excluded from the interior of the rock bit. The grease reservoir comprises a cavity 29 in the rock bit body, which is connected to the ball passage 26 by a lubricant passage 31. Grease also fills the portion of the ball passage adjacent the ball retainer, the open groove 18 on the upper side of the journal pin, and a diagonally extending passage 32 therebetween. Grease is retained in the bearing structure by a resilient seal in the form of a ring 33 between the cone and journal pin.

A pressure compensation subassembly is included in the grease reservoir 29. The subassembly comprises a metal cup 34 with an opening 36 at its inner end. A flexible rubber bellows 37 extends into the cup from its outer end. The bellows is held into place by a cap 38 with a vent passage 39. The pressure compensation subassembly is held in the grease reservoir by a snap ring 41.

When the rock bit is filled with grease, the bearings, the groove 18 on the journal pin, passages in the journal pin, the lubrication passage 31, and the grease reservoir on the outside of the bellows 37 are filled with grease. If the volume of grease expands due to heating, for example, the bellows 37 is compressed to provide additional volume in the sealed grease system, thereby preventing accumulation of excessive pressures. High pressure in the grease system can damage the seal 33 and permit drilling mud or the like to enter the bearings. Such material is abrasive and can quickly damage the bearings. Conversely, if the grease volume should contract, the bellows can expand to prevent low pressures in the sealed grease system, which could cause flow of abrasive and/or corrosive substances past the seal.

The bellows has a boss 42 at its inner end which can seat against the cap 38 at one end of the displacement of the bellows for sealing the vent passage 39. The end of the bellows can also seat against the cup 34 at the other end of its stroke, thereby sealing the opening 36. If desired, a pressure relief check valve can also be provided in the grease reservoir for relieving over-pressures in the grease system that could damage the seal. Even with a pressure compensator, it is believed that occasional differential pressures may exist across the seal of over 150 psi (550 kilopascals).

To maintain the desired properties of the seal at the pressure and temperature conditions that prevail in a rock bit, to inhibit "pumping" of the grease through the seal, and for a long useful life, it is important that the seal be resistant to crude oil and other chemical compositions found within oil wells, have a high heat and abrasion resistance, have low rubbing friction, and not be readily deformed under the pressure and temperature conditions in a well which could allow leakage of the grease from within the bit or drilling mud into the bit.

A variety of seals have been employed in such rock bits, such as O-ring type seals, high aspect ratio seals, and other seal configurations having a symmetric axial cross-sectional geometry. Such seals are conventionally formed from a single type of homogeneous rubber or elastomeric material, such as acrylonitrile polymers or acrylonitrile/butadiene copolymers. The rubber material that is selected to form the seal has particular properties of hardness, modulus, wear resistance, tensile strength, friction resistance, and temperature stability under operating conditions. Such seals generally include a dynamic seal surface and a static seal surface that are placed into contact with respective rotating and stationary rock bit surfaces, and that are subject to different operating conditions at each surface. The main body portion of a seal, between the contact surfaces, acts as an energizer to keep the contact surfaces engaged with its respective sealing elements on the rock bit.

Because each dynamic seal surface is exposed to operating conditions of pressure and temperature that are different from those occurring at the static seal surface, seals that are formed from a single type of material are necessarily not perfectly suited to meet the operating conditions at each surface. The single type of seal material chosen represents a compromise between meeting the operating conditions at both seal surfaces. This compromise either results in the failure of the seal at the dynamic seal surface, because the seal material was too soft or not sufficiently wear resistant to withstand the high wear and temperature conditions occurring at the dynamic seal surface, or failure at the static seal surface, because the seal material is too hard and not sufficiently deformable to maintain a stationary positioned against an adjacent rock bit surface.

Referring to FIG. 3, one embodiment of a dual functioning seal 33 constructed according to principles of this invention includes an annular ring-shaped seal body 52 that is formed from two different types of rubber or elastomeric materials that are each selected to best meet the different operating conditions at the different seal surfaces. In a preferred seal embodiment, the seal body 52 includes a dynamic seal surface 54, along a circumference of an inside diameter of the body, and a static seal surface 56, along a circumference of an outside diameter of the body.

The dynamic seal surface 54 is subjected to a high degree of wear and heat from rotation against the rock bit journal bearing surface. Under operating conditions, the dynamic surface is typically subjected to temperatures in the range of from about 175 to 200° C., pressures of approximately 17,000 kilopascals or greater, and rotational speeds varying from about 60 to about 400 rpm. Additionally, the dynamic seal surface is subjected to a highly abrasive environment of drilling fluid and hostile chemicals.

Suitable materials for forming the portion of the seal body that defines the dynamic seal surface 54 include rubber and elastomeric materials selected from the group comprising carboxylated nitrites, highly-saturated nitrile (HSN) elastomers, nitrile-butadiene rubber (HBR), highly saturated nitrile-butadiene rubber (HNBR) and the like that have a modulus of elasticity at 100 percent elongation of greater than about 4,500 kilopascals, and that have a standard compression set after 70 hours at 100° C. of less than about 20 percent.

Preferred materials useful for forming the dynamic seal surface include those having a durometer Shore A hardness measurement in the range of from about 75 to 95, and more preferably greater than about 80. Preferred dynamic seal materials have a modulus of elasticity at 100 percent elongation of in the range of from about 700 to 2,000 psi, elongation of from about 100 to 400 percent, a tensile strength of in the range of from about 1,500 and 4,000 psi, and a compression set after 70 hours at 100° C. in the range of from about 8 to 18 percent. A material having these properties will provide the desired degree of wear resistance, abrasion resistance, friction resistance, and temperature stability to provide enhanced seal performance at the dynamic seal surface under operating conditions, thereby extending the service life of the rock bit.

Harder rubber or elastomeric materials are preferred to form the dynamic seal surface because they are also more stable under high temperature conditions. Using harder materials to form the dynamic seal surface reduces friction torque and minimizes stick slip, thereby resulting in less adhesive wear and less heat generation at the dynamic surface of the seal.

Other suitable materials useful for forming the dynamic seal surface 54 include so called self-lubricating rubber or elastomeric compounds that include one or more lubricant additive(s) to provide enhanced properties of wear and friction resistance. Such self-lubricating compounds have the same physical properties as that described above. A preferred self-lubricating compound includes HNBR comprising one or more lubricant additive selected from the group of dry lubricants comprising graphite flake, hexagonal boron nitride (hBN) and the like, and mixtures thereof. It has been discovered that hBN or graphite flake can be used as a partial substitute for carbon black to provide strength to the elastomeric material, to reduce the coefficient of friction of the elastomeric material, and to reduce the amount of abrasive wear that is caused by the elastomeric material, i.e., to make the elastomeric seal less abrasive against the mating journal bearing surface. In an exemplary embodiment, HNBR used to form the dynamic seal comprises in the range of from about 5 to 20 percent by volume graphite flake or hBN.

A particularly preferred HSN elastomer (HSN-8A) useful for forming the dynamic seal surface has a durometer Shore A hardness measurement in the range of from about 77–84, a modulus of elasticity at 100 percent elongation of in the range of from about 5,500 to 8,700 kilopascals, elongation in the range of from about 150 to 400 percent, a tensile strength in the range of from about 7,000 to 31,000 kilopascals, and a compression set after 70 hours at 100° C. of less than about 18 percent.

The static seal surface 56 of the seal body 52 is not subjected to the same extreme operating conditions of operating temperature, relative motion, abrasives between dynamic surfaces, and the like, as the dynamic seal surface 54. Seal properties of wear resistance, low coefficient of friction, high temperature stability, and the like are not as important at the static seal surface. The static seal surface is, therefore, preferably formed from relatively softer, i.e., low durometer hardness, rubber or elastomeric materials having a high coefficient of friction and that are capable of being deflected and squeezed against an adjacent static cone surface to ensure a stationary position against such surface. The softer material is also better able to act as an energizer than the relatively harder materials to transfer a force onto the dynamic seal surface for producing a sufficient amount of contact pressure between the dynamic seal surface and the adjacent journal bearing surface.

Suitable rubber materials useful for forming the static seal surface 56 comprise nitrile and HSN elastomers that have a durometer Shore A hardness measurement in the range of from about 60 to 80, and preferably less than about 75. A preferred static seal material has a modulus of elasticity at 100 percent elongation of between about 2,700 to 5,000 kilopascals, elongation of from about 200 to 1,000 percent, a minimum tensile strength of from about 7,000 to 28,000 kilopascals, and a compression set after 70 hours at 100° C. in the range of from about 5 to 18 percent. A material having such properties forms a seal surface that provides a desired degree of deflection and adhesion to provide enhanced seal performance at the static seal surface under operating conditions, thereby extending the service life of the rock bit.

A preferred rubber or elastomeric material for use in forming the static seal surface 56 is HSN that has a durometer Shore A hardness measurement in the range of from about 73 to 78, a modulus of elasticity at 100 percent elongation of between about 3,500 to 4,200 kilopascals, elongation of from about 300 to 400 percent, a minimum tensile strength of approximately 27,000 kilopascals, and a compression set after 70 hours at 100° C. of approximately 14 percent.

An exemplary dual functioning rock bit seal embodiment has a dynamic seal surface that is formed from an elastomeric material having a Shore A durometer measurement at least five points higher than the elastomeric material used for forming the static seal surface. Rock bits seals having dynamic and static seal surfaces formed from elastomeric materials having at least a five point Shore A hardness measurement difference display a desired degree of both wear resistance and contact pressure at each dynamic and static seal surface, thereby optimizing the service life of a rock bit.

Referring to FIG. 4, dual functioning seals 33 constructed according to principles of this invention have a dynamic seal surface 54 geometry that is different than that of the static seal surface 56 for purposes of imposing a desired amount of contact pressure against each respective adjacent rock bit dynamic and static surface to optimize sealing at each surface. It has been discovered that the degree of contact pressure exerted by the seal against an adjacent surface is greatly affected by the degree or radius of curvature of the seal surface at the point of contact. Generally, the larger the radius of curvature and/or the larger the contact length of a radial cross section of the seal, the lower the contact pressure. As seen in a radial cross section of the seal illustrated for example in FIG. 3, it is desired that the contact length of a radial cross section of the seal be greater on the dynamic surface than on the static surface.

To achieve a good dynamic seal in a rock bit rotary seal application, especially for pressure velocity (PV) values higher than 150,000 psi-fpm (PV being defined as contact pressure times relative surface velocity), it is important that the seal have a dynamic surface geometry that provides a degree of deflection to produce a desired degree of contact pressure. Additionally, it is important that the seal geometry act to confine the seal and distribute the wear and heat generated in the sliding and abrasive wear process so that the seal meets service and life expectations.

It is desired that the dynamic seal surface 54 be configured to produce a low contact pressure against an adjacent to reduce the PV value, while the static surface of the seal be configured to produce a high contact pressure against an adjacent stationary cone surface to ensure that there is no seal movement. In a preferred embodiment, the seal body 52 is configured having an asymmetric axial cross-sectional geometry comprising a rounded dynamic seal surface 54 along a circumference of an inside diameter, and a rounded static seal surface 56 along a circumference of an outside diameter. The dynamic seal surface 54 has a radius of curvature greater than that of the static seal surface 56 to provide a reduced contact pressure against an adjacent journal bearing surface, and to provide a relatively wide contact area to ensure uniform pressure distribution therebetween. The cross-sectional geometric shape of the seal is similar to that of a bullet.

In an exemplary embodiment, the dynamic seal surface has a radius of curvature greater than about one half of or 0.5 times the axial thickness of the seal body, and less than about 15 times of the axial thickness of the seal body, as measured in the direction of the journal axis. The dynamic seal surface also has a radius of curvature that is greater than a radius of curvature of the static surface. In a preferred embodiment, the dynamic seal surface has a radius of curvature in the range of from about 0.6 to 5 times that of the axial seal thickness. A dynamic seal surface having a radius of curvature within this range provides a sufficient degree of contact pressure against an adjacent journal bearing surface to both ensure an optimal degree of sealing while maximizing seal life.

The dynamic seal surface can have a radius of curvature that approaches infinity, i.e., it may have a near planar geometry. Dynamic seal surfaces having a flat or planar geometry are generally not desired because the flat edges of the dynamic seal configured in this manner can nibble and tear when rotated against the dynamic journal surface and when subjected to the high operating temperatures and differential pressures within a rock bit. To avoid this problem, an alternative embodiment of the dynamic seal surface can be configured having a planar surface with angled or cut-away edges, eliminating contact between the edges and the dynamic journal surface and, thereby avoiding any chamfering or tearing at the dynamic seal edges.

The static seal surface 56 is configured having a radius of curvature less than that of the dynamic seal surface 54 to provide an increased contact pressure against an adjacent stationary cone surface. In a preferred embodiment, the static seal surface has a radius of curvature less than about one half of or 0.5 times the axial thickness of the seal body and, more preferably in the range of from about 0.1 to 0.4 times the axial thickness of the seal body. A static seal surface having a radius of curvature within this range provides a sufficient degree of contact pressure against an adjacent journal bearing surface to both prevent seal movement against the cone, and to provided a sufficient energizing force to the dynamic seal surface.

As mentioned above, the dynamic seal surface has a radius of curvature that is greater than the radius of curvature of the static seal surface. In a preferred embodiment the radius of curvature of the dynamic seal surface is at least ten percent or 1.1 times greater than the radius of curvature of the static seal surface. A seal comprising static and dynamic sealing surfaces having such differently configured radii provide a desired difference in contact pressure at each respective static and dynamic surface.

It is also desired that seals constructed according to principles of this invention have a radial length, as measured from the dynamic seal surface to the static seal surface, that acts together with the specific geometry of each seal surface to optimize the amount of contact pressure at each surface. In a preferred embodiment, the seal radial length is in the range of from about one to three times the axial thickness of the seal body. A seal having a seal radial length within this range, when combined with the preferred seal materials and dynamic and static seal radii, effectively bring the contact pressure on the dynamic seal surface within a desired low level at a fairly higher squeeze amount, which would be too large and create too large of a contact pressure for an O-ring seal, or even a high-aspect ratio seal made from a single homogeneous harder rubber.

Dual functioning seals, constructed according to principles of this invention, comprise static and dynamic seal surfaces that are both configured having the desired seal geometry, and that are formed from the different desired seal materials described above. The seal construction, comprising different surface geometries and different seal materials at each static and dynamic seal surface, is tailored to meet the different operating conditions and sealing requirements at each seal surface to optimize seal performance and maximize seal and rock bit service life.

Referring again to FIG. 4, the portion of the seal body 52 defining the dynamic seal surface 54 is formed from the relatively harder rubber or elastomeric materials 58 described above. The remaining portion of the seal body 52, including the static seal surface 56, is formed from the relatively softer rubber or elastomeric materials 60. It is desired that the major proportion of the seal body be formed from the relatively softer rubber or elastomeric material to ensure that the seal construction provides a sufficient amount of squeeze between the rock bit surfaces to thereby produce a sufficient amount of contact pressure against each dynamic and static rock bit surface.

In a preferred embodiment, the seal body portion formed from the relatively harder and more wear resistant rubber or elastomeric material extends along the seal body from a tip portion of dynamic seal surface to about ⅛ to ⅓ of the seal radial length. It is understood that the proportion of the seal body formed from each different seal material will depend on a number of factors such as the particular types of seal materials chosen, the particular dynamic and static seal surface geometries, the size of the seal, and the particular seal application.

The seal is configured having a generally uniform thickness, as measured axially between the static and dynamic seal surfaces, that is defined by parallel seal body walls 62 and 64. The thickness of the seal depends on the particular size, geometry and application of the seal. Moving from the outside diameter of the seal body to the inside diameter, the static seal surface 56 flares or is tapered axially outward to meet each respective body wall 62 and 64. In an exemplary seal embodiment, where the radius of curvature for the static seal surface 56 is approximately two millimeters and the axial thickness of the seal body is approximately five millimeters, the static seal surface flares axially toward each wall 62 and 64 at an angle of approximately 30 degrees, as measured along an axis running between the static to the dynamic seal surface. In this particular exemplary seal embodiment, the seal has an inside diameter of approximately 50 millimeters, an outside diameter of approximately 71 millimeters, a radial length of approximately ten millimeters, the dynamic seal surface 54 has a radius of curvature of approximately three millimeters, and the portion of the seal body formed from the relatively harder rubber or elastomeric material extends radially from the dynamic seal surface approximately two millimeters toward the static seal surface.

It is to be understood that the exemplary embodiment of the seal is provided for purposes of reference and illustration, and that seals constructed according to principles of this invention can be sized differently depending on the particular application.

Dual functioning seals of this invention are constructed as a two component product by forming a first seal assembly, comprising a major proportion of the seal body including the static seal surface, by conventional compression molding technique using the relatively softer rubber or elastomeric material. A second seal assembly, comprising a minor proportion of the seal including the dynamic seal surface, by conventional compression molding technique using the relatively harder rubber or elastomeric material. It is desired that both the first and second seal assemblies not be allowed to fully cure. The first and second seal assemblies are combined together and placed into a compression mold having the approximate configuration of the completed seal, and the two seal assemblies are covulcanized to form a unitary seal construction. Suitable adhesives useful for promoting bonding between the two seal assemblies include CHEMLOCK 252, manufactured by Lord Corp. To facilitate good covulcanization between the first and second seal assemblies, it is desired that the elastomeric materials selected to form both the dynamic and static seal surfaces be chemically compatible.

Referring to FIG. 5, another embodiment of a dual functioning seal 66 comprises a seal body 68 having a dynamic seal surface 70 at an inside body diameter, and a static seal surface 72 at an outside body diameter. The seal body, and seal surfaces are configured in the same manner previously described for the embodiment of the dual functioning seal illustrated in FIGS. 3 and 4, i.e., having an asymmetric axial cross-sectional profile.

The seal 66 is formed from three different elastomeric material, wherein the seal body 68 is formed from an elastomeric material 74 having a lower modulus than an elastomeric material 76 used to form the dynamic seal surface 70, and wherein the static seal surface 72 is formed from an elastomeric material 78 different than both materials 74 and 76. It is desired that the material 78 selected to form the static seal surface 72 have a coefficient of friction that is greater than both materials 74 and 76. The materials selected to form the seal body and both seal surfaces can be the same as or different than those previously described above. Additionally, it is desired that the material used to form the seal body and both seal surfaces each have a different modulus of elasticity and, preferably, the material selected to form the seal body has a modulus that is less than that of the material used to form the dynamic seal surface.

An advantage of this seal embodiment is that it allows a seal designer to select materials to form the dynamic and static seal surfaces that are best suited to perform under the different operating conditions at each surface. In the two-material seal embodiment, the single material that is selected to form both the seal body and static seal surface represents a compromise, as the material must act both as an energizer in the seal body, to ensure that a desired degree of contact pressure is imposed by the dynamic seal surface against the bearing, and as a high-friction surface in the static seal surface, to ensure that the static seal surface does not slip against the cone surface. The three-material seal embodiment permits a designer to select a material to form the body that provides a desired degree of contact pressure, and a material to form the static seal surface that has desired high-friction characteristics, without sacrificing seal performance.

Referring to FIG. 6, dual functioning seals 33 of this invention are preferably interposed between a dynamic journal surface 80 and a static cone surface 82. It is desired that the seal have an outside diameter that is slightly larger than the diameter of the cone surface so that placement of the seal within the cone causes the seal to be circumferentially loaded therein. It is desired that, when loaded into the cone, the seal is squeezed in the range of from about 2 to 15 percent, i.e. the radial thickness of the seal is reduced by this amount. In a preferred embodiment, the seal is squeezed by approximately eight percent.

Such circumferential seal loading is important because it allows for a greater contact force to be applied to the cone by the static seal surface than that applied to the journal by the dynamic seal surface, thereby minimizing any potential radial seal movement at the static surface.

Referring to FIG. 7, in an alternative embodiment, the cone surface 84 is configured having an axially nonlinear, e.g., V-shaped or ramped, configuration in a radial section taken through the cone axis. Such alternatively configured cone surface is useful for preventing the seal from twisting upon itself or otherwise moving axially within the rock bit. In such alternative embodiment, it is desired that the cone surface be adapted to accommodate placement of at least a portion of the static seal surface therein.

Although, limited embodiments of dual functioning seals have been described and illustrated herein, many modifications and variations will be apparent to those skilled in the art. For example, dual functional seals may be constructed, according to principles of this invention, having other asymmetric axial cross-sectional geometries than that specifically described and illustrated. Accordingly, it is to be understood that within the scope of the appended claims, that dual functioning seals constructed according to principles of this invention may be embodied other than as specifically described herein.

What is claimed is:

1. A rotary cone rock bit comprising:
    a bit body having at least one leg, the leg including a journal pin;
    a cutter cone rotatably mounted on the leg; and
    an annular elastomeric seal ring located between a first sealing surface on said leg and a second sealing surface on the cutter cone that forms a dynamic rotary seal between the leg and cutter cone while the cutter cone is rotating, the seal ring having:
        a first seal surface for forming a seal against the first sealing surface; and
        a second seal surface for forming a seal against the second sealing surface, the first and second seal surfaces being permanently secured to the seal ring to form a one-piece seal construction, and one of the first or second seal surfaces forming the dynamic rotary seal having a radius of curvature greater than one half of an axial seal ring thickness before being installed within the rock bit.

2. The rotary cone rock bit as recited in claim 1 wherein the seal ring first seal surface is asymmetric with respect to the seal ring second seal surface before being installed in the rock bit.

3. The rotary cone rock bit as recited in claim 1 wherein a substantial portion of the seal ring second seal surface is free within the cone to energize the seal ring first seal surface against the leg first sealing surface to effect the dynamic seal.

4. The rotary cone rock bit as recited in claim 1 wherein the dynamic seal is formed between the leg first sealing surface and seal ring first seal surface, wherein the seal ring second seal surface is positioned along a diameter of the seal ring, and at least a portion of the seal ring second seal surface does not contact the cone second sealing surface.

5. The rotary cone rock bit as recited in claim 1 wherein the seal ring includes axial surfaces disposed between the seal first and second seal surfaces, and wherein a substantial portion of at least one seal ring axial surface is free from contacting an adjacent cone surface.

6. The rotary cone rock bit as recited in claim 1 wherein the dynamic seal is located between the cutter cone and the journal pin.

7. The rotary cone rock bit as recited in claim 6 wherein the dynamic seal is formed at the first sealing surface by the seal ring first seal surface.

8. The rotary cone rock bit as recited in claim 1 wherein the dynamic seal is formed between the first sealing surface and the seal ring first seal surface, and wherein a relatively static seal is formed between the second sealing surface and the seal ring second seal surface.

9. The rotary cone rock bit as recited in claim 8 wherein the seal ring first seal surface is positioned along an inside seal ring diameter and the seal ring second seal surface is positioned along an outside seal ring diameter.

10. The rotary cone rock bit as recited in claim 9 wherein the seal ring first seal surface has a axial contact length with the leg first sealing surface that is greater than an axial contact length between the seal ring second seal surface and cone second sealing surface.

11. The rotary cone rock bit as recited in claim 1 wherein the seal ring first seal surface has a radius of curvature greater than the seal ring second seal surface.

12. The rotary cone rock bit as recited in claim 1 wherein the seal ring second seal surface has a radius of curvature that is less than one half of an axial thickness of the seal ring.

13. The rotary cone rock bit as recited in claim 1 wherein at least one of the seal ring first or second seal surfaces is formed from an elastomeric material that is different than that used to form a remaining portion of the seal ring.

14. A rotary cone rock bit comprising:
 a bit body having at least one leg, the leg including a journal pin;
 a cutter cone rotatably mounted on the leg; and
 a seal ring located between a first sealing surface on the leg and a second sealing surface on the cutter cone and forming a dynamic rotary seal between the leg and cutter cone while the cutter cone is rotating, the seal ring including:
  a first seal surface along one seal ring face for forming a seal against the leg first sealing surface; and
  a second seal surface along another seal ring face for forming a seal against the cone second sealing surface, the first and second seal surfaces being permanently secured to the seal ring to form a one-piece seal construction, a substantial portion of the seal ring second seal surface being free within the cone to energize the seal ring first seal surface against the leg first sealing surface, and the first seal surface having a radius of curvature that is greater than that of the seal ring second seal surface before being installed in the rock bit.

15. The rotary cone rock bit as recited in claim 14 wherein the dynamic rotary seal is formed between the journal pin and the seal ring first seal surface, and wherein the seal ring first seal surface is positioned along an inside diameter of the seal ring.

16. The rotary cone rock bit as recited in claim 15 wherein the seal ring first seal surface extends along a substantially entire inside diameter of the seal ring and has a substantially continuous radius of curvature.

17. The rotary cone rock bit as recited in claim 14 wherein the seal ring has axial surfaces between the first and second seal surfaces, and wherein a substantial portion of at least one axial surface does not contact an adjacent cutting cone surface.

18. The rotary cone rock bit as recited in claim 14 wherein at least one of the seal ring first or second seal surfaces is formed from an elastomeric material that is different than that of a remaining seal ring portion.

19. The rotary cone rock bit as recited in claim 14 wherein the seal ring first and second seal surfaces are formed from different elastomeric materials having different wear resistance and hardness characteristics.

20. The rotary cone rock bit as recited in claim 14 wherein the seal ring first seal surface has a radius of curvature that is at least ten percent greater than a radius of curvature of the seal ring second seal surface before being installed within the rock bit.

21. The rotary cone rock bit as recited in claim 14 wherein the seal ring second seal surface is disposed along an outside diameter of the seal ring, and wherein the first seal surface is disposed along an inside diameter of the seal ring.

22. The rotary cone rock bit as recited in claim 21 wherein at least a portion of the second seal surface does not contact the cutter cone surface.

23. The rotary cone rock bit as recited in claim 14 wherein the seal ring has an outwardly tapered axial surface moving radially along a seal ring axial surface from the second seal surface towards the first seal surface.

24. A rotary cone rock bit comprising:
 a bit body having at least one leg, the leg including a journal pin;
 a cutter cone rotatably mounted on the leg; and
 a seal ring located between a first sealing surface on the leg and a second sealing surface on the cutter cone and forming a dynamic rotary seal between the leg and cutter cone while the cutter cone is rotating, the seal ring including:
  a first seal surface positioned at one of the seal ring inside or outside diameter for forming a seal against the leg first sealing surface;
  a second seal surface positioned at the other of the seal ring inside or outside diameter for forming a seal against the second sealing surface, the first and second seal surfaces being permanently secured to the seal ring to form a one-piece seal construction;
  axial surfaces between the seal ring first and second seal surfaces, a substantial portion of at least one seal ring axial surface being positioned a distance from an adjacent cone surface, and one of the seal ring first or second seal surfaces forming the dynamic rotary seal having a radius of curvature that is greater than the other of the seal ring first or second seal surfaces before being installed within the rock bit.

25. The rotary cone rock bit as recited in claim 24 wherein the dynamic rotary seal is formed between the leg first sealing surface and the seal ring first seal surface, and wherein a relatively static seal is formed between the cone second sealing surface and the seal ring second seal surface.

26. The rotary cone rock bit as recited in claim 25 wherein a substantial portion of the seal ring second seal surface is free within the cone to energize the seal ring first seal surface against the leg first sealing surface to effect the dynamic rotary seal.

27. The rotary cone rock bit as recited in claim 24 wherein the seal ring second seal surface has a radius of curvature that is less than one half of an axial thickness of the seal ring.

28. The rotary cone rock bit as recited in claim 24 wherein the seal ring first seal surface is formed from an elastomeric material that is different than that used to form the seal ring second seal surface.

29. A rotary cone rock bit comprising:
- a bit body having at least one leg, the leg including a journal pin;
- a cutter cone rotatably mounted on the leg; and
- a seal ring located between a first sealing surface on the leg and a second sealing surface on the cutter cone and forming a dynamic rotary seal between the leg and cutter cone while the cutter cone is rotating, the seal ring including:
  - a first seal surface positioned along an inside seal ring diameter for forming the dynamic rotary seal against the leg first sealing surface;
  - a second seal surface positioned along an outside seal ring diameter for forming a relatively static seal against the cone second sealing surface, the first and second seal surfaces being permanently secured to the seal ring to form a one-piece seal construction, the first seal surface having a radius of curvature that is greater than that of the seal ring second sealing surface before being installed within the rock bit; and
  - axial seal ring surfaces positioned between the seal ring first and second seal surfaces, the seal ring being installed in the rock bit so that a substantial portion of at least one axial surface is positioned a distance from an adjacent cone surface.

30. The rotary cone rock bit as recited in claim 29 wherein the first seal surface is positioned along substantially the entire seal ring inside diameter and has a substantially continuous radius of curvature before being installed within the rock bit.

31. The rotary cone rock bit as recited in claim 30 wherein a substantial portion of the seal ring second seal surface is free within the cone to energize the seal ring first seal surface against the leg first sealing surface to effect the dynamic rotary seal.

* * * * *